(12) United States Patent
Ishibashi (10) Patent No.: US 12,365,547 B2
(45) Date of Patent: Jul. 22, 2025

(54) TEMPERATURE DETECTION DEVICE AND METHOD FOR CONVEYOR BELT

(71) Applicant: THE YOKOHAMA RUBBER CO., LTD., Tokyo (JP)

(72) Inventor: Yusuke Ishibashi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 210 days.

(21) Appl. No.: 18/019,140

(22) PCT Filed: Sep. 15, 2021

(86) PCT No.: PCT/JP2021/033862
§ 371 (c)(1),
(2) Date: Feb. 1, 2023

(87) PCT Pub. No.: WO2022/097373
PCT Pub. Date: May 12, 2022

(65) Prior Publication Data
US 2023/0278807 A1 Sep. 7, 2023

(30) Foreign Application Priority Data
Nov. 5, 2020 (JP) .................................. 2020-184894

(51) Int. Cl.
*B65G 43/02* (2006.01)
*B65G 15/34* (2006.01)
(Continued)

(52) U.S. Cl.
CPC ............. *B65G 43/02* (2013.01); *B65G 15/34* (2013.01); *G01K 1/024* (2013.01); *G01K 1/026* (2013.01);
(Continued)

(58) Field of Classification Search
CPC .............................. B65G 43/02; B65G 15/34; B65G 2203/0266; B65G 2203/045; G01K 1/024;
(Continued)

(56) References Cited

U.S. PATENT DOCUMENTS 8,397,904 B2  3/2013  Bogle
2012/0217138 A1*  8/2012  Bogle ................... A23B 2/001
198/810.01

FOREIGN PATENT DOCUMENTS

DE   102010038817 A1 *  2/2012 ............... G01K 1/14
DE   102015224562 A1 *  6/2017 ............. B65G 43/02
(Continued)

*Primary Examiner* — Gene O Crawford
*Assistant Examiner* — Abby A Jorgensen
(74) *Attorney, Agent, or Firm* — Carrier, Shende & Associates P.C.; Joseph P. Carrier; Fulchand P. Shende (57) ABSTRACT

A temperature detection device and method that can simply and accurately detect the presence or absence of abnormal heating of a conveyor belt. Correlation data between an electrical resistance value of a passive IC tag embedded in a conveyor belt and a temperature of the IC tag when it is activated is grasped in advance when the tag receives a transmitted radio wave from a non-contact detector. Data of electrical resistance value when the IC tag is activated is received by the detector through a returned radio wave returned from the tag in response to the transmitted radio wave transmitted from the detector toward the tag embedded in the conveyor belt running. A temperature at a position of the conveyor belt where the tag is embedded is calculated in accordance with the data of the electrical resistance value received and the correlation data.

7 Claims, 8 Drawing Sheets

(51) Int. Cl.
*G01K 1/02* (2021.01)
*G01K 1/024* (2021.01)
*G01K 1/14* (2021.01)
*G01K 7/16* (2006.01)

(52) U.S. Cl.
CPC ............... *G01K 1/14* (2013.01); *G01K 7/16* (2013.01); *B65G 2203/0266* (2013.01); *B65G 2203/045* (2013.01)

(58) Field of Classification Search
CPC ............ G01K 1/026; G01K 1/14; G01K 7/16; G01K 3/005; G01K 13/08
See application file for complete search history.

(56) References Cited

FOREIGN PATENT DOCUMENTS

| | | | | |
|---|---|---|---|---|
| JP | 2005164527 A | * | 6/2005 | |
| JP | 2006052039 A | * | 2/2006 | ............ B65G 43/02 |
| JP | 2010-037096 A | | 2/2010 | |
| JP | 5732060 B2 | | 6/2015 | |
| WO | WO-2018189959 A1 | * | 10/2018 | ............ B65G 43/02 |
| WO | WO-2019102586 A1 | * | 5/2019 | ............ G01K 7/32 |
| WO | WO-2021122632 A1 | * | 6/2021 | ............ B65G 15/34 |

\* cited by examiner

FIG. 8 ured in the dusty environment where the conveyor line is used, the surveillance camera

TEMPERATURE DETECTION DEVICE AND METHOD FOR CONVEYOR BELT

TECHNICAL FIELD

The present invention relates to a temperature detection device and method for a conveyor belt and more particularly to a temperature detection device and method that can simply and accurately detect the presence or absence of abnormal heating of a conveyor belt.

BACKGROUND ART

In a conveyor line, various conveyed objects are placed on a conveyor belt that runs and is mounted between pulleys of a conveyor device and are conveyed to a destination. Support rollers are disposed at appropriate intervals between the pulleys, and the conveyor belt runs while being supported by these support rollers. If rotation of a support roller malfunctions, the frictional resistance between the support roller and the conveyor belt running increases, abnormally heating the conveyor belt. Or if the conveyor belt runs while contacting the frames of the conveyor device, the conveyor belt is abnormally heated. This abnormal heating can cause a fire in the conveyor line.

To detect a problem such as a fire in a conveyor line, the state of the conveyor belt is monitored by capturing an image of the conveyor device with, for example, a surveillance camera. Alternatively, a method of monitoring the state of the conveyor belt by detecting the temperature of the conveyor belt with a thermometer has been proposed (see Patent Literature 1). Unfortunately, in the dusty environment where a conveyor line is used, the surveillance camera sometimes cannot capture a clear image and is likely to malfunction. To detect the temperature of a conveyor belt running, a non-contact temperature sensor, such as a thermography, needs to be used. This requires a large equipment cost and is disadvantageous for accurate temperature detection due to obstructions to temperature detection, such as powder dust. Therefore, there is room for improvement in simply and accurately detecting the presence or absence of abnormal heating of the conveyor belt.

CITATION LIST

Patent Literature

Patent Literature 1: JP 2010-37096 A

SUMMARY OF INVENTION

Technical Problem

An object of the present invention is to provide a temperature detection device and method that can simply and accurately detect the presence or absence of abnormal heating of a conveyor belt.

Solution to Problem

To achieve the object described above, a temperature detection device for a conveyor belt according to an embodiment of the present invention includes a passive IC tag embedded in a conveyor belt, a detector configured to wirelessly communicate with the IC tag without contacting the conveyor belt, and a calculation unit connected to the detector, and a returned radio wave returned from the IC tag in response to a transmitted radio wave transmitted from the detector toward the IC tag is received by the detector. Correlation data between an electrical resistance value in the IC tag and a temperature of the IC tag when the IC tag is activated by receiving the transmitted radio wave is input to the calculation unit. The transmitted radio wave is transmitted from the detector toward the IC tag embedded in the conveyor belt mounted between pulleys and running. Data of the electrical resistance value is received by the detector through a returned radio wave returned from the IC tag in response to the transmitted radio wave. A temperature at a position of the conveyor belt where the IC tag is embedded is calculated by the calculation unit in accordance with the data of the electrical resistance value received and the correlation data.

A temperature detection method for a conveyor belt according to an embodiment of the present invention for detecting a temperature of the conveyor belt by using a passive IC tag embedded in a conveyor belt, a detector configured to wirelessly communicate with the IC tag without contacting the conveyor belt, and a calculation unit connected to the detector to cause a returned radio wave returned from the IC tag in response to a transmitted radio wave transmitted from the detector toward the IC tag to be received by the detector includes grasping in advance correlation data between an electrical resistance value in the IC tag and a temperature of the IC tag when the IC tag is activated by receiving the transmitted radio wave, transmitting a transmitted radio wave from the detector toward the IC tag embedded in the conveyor belt mounted between pulleys and running, receiving, by the detector, data of the electrical resistance value through a returned radio wave returned from the IC tag in response to the transmitted radio wave, and calculating, by the calculation unit, a temperature at a position of the conveyor belt where the IC tag is embedded in accordance with the data of the electrical resistance value received and the correlation data.

Advantageous Effects of Invention

The temperature detection device according to an embodiment of the present invention has a simple configuration including a passive IC tag, a detector configured to wirelessly communicate with the IC tag without contacting the conveyor belt, and a calculation unit connected to the detector. Thus, the temperature detection device can be configured with general-purpose components, which is advantageous in terms of cost reduction. In an embodiment of the present invention, correlation data between the electrical resistance value of the IC tag and the temperature of the IC tag when the IC tag is activated is grasped in advance. The data of the electrical resistance value of the IC tag when the IC tag embedded in the conveyor belt running is activated can be obtained by wireless communication between the IC tag and the detector. The data of the electrical resistance value is not substantially affected by the dusty environment where the conveyor line is used. Therefore, the temperature of the conveyor belt at the position where the IC tag is embedded can be calculated by the calculation unit in accordance with the data of the electrical resistance value and the correlation data even in the dusty environment, allowing the presence or absence of abnormal heating of the conveyor belt to be simply and accurately detected.

DESCRIPTION OF EMBODIMENTS

Hereinafter, the temperature detection device and method for a conveyor belt according to an embodiment of the present invention will be described in accordance with the embodiments illustrated in the drawings.

A temperature detection device for a conveyor belt 1 (hereinafter referred to as a detection device 1) according to an embodiment of the present invention illustrated in FIGS. 1 to 4 is installed in a conveyor device 10. A conveyor belt 13 is mounted between pulleys 11a and 11b of the conveyor device 10. The conveyor belt 13 is supported by a large number of support rollers 12 between the pulleys 11a and 11b. An arrow L in the drawing indicates a longitudinal direction of the conveyor belt 13, and an arrow W indicates a width direction of the conveyor belt 13.

Figure 4:
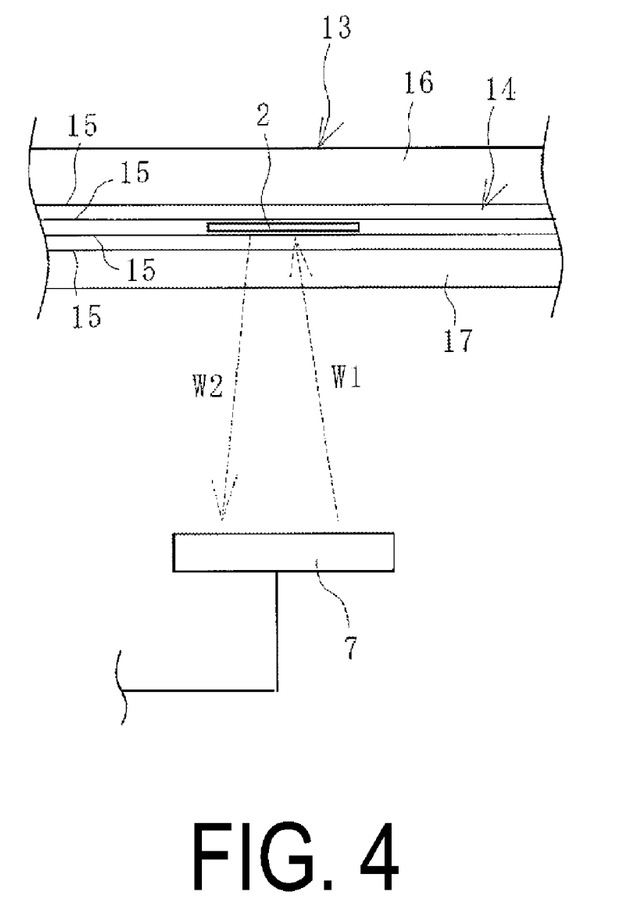
FIG. 4 is an explanatory diagram illustrating the conveyor belt of FIG. 3 in a cross-sectional view.

The conveyor belt 13 is constructed with an upper cover rubber 16, a lower cover rubber 17, and a core layer 14 disposed therebetween integrated by vulcanization adhesion. The core layer 14 is constructed with a plurality of canvases 15 layered. The number of layered canvases 15 is appropriately determined according to the required performance of the conveyor belt 13, and is, for example, four to eight layers. The core layer 14 is not limited to the canvas 15 and may be composed of a large number of steel cords arranged side by side. The conveyor belt 13 is provided with other members as required.

Figure 2:
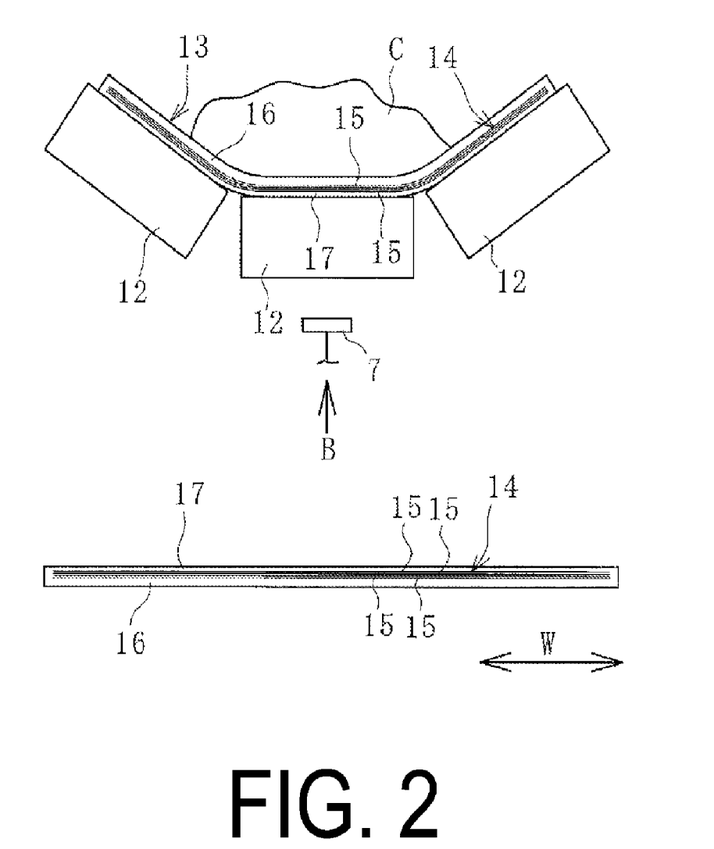
FIG. 2 is a cross-sectional view taken along a line A-A of FIG. 1.

On a carrier side of the conveyor device 10, the lower cover rubber 17 of the conveyor belt 13 is supported by the support rollers 12, making the conveyor belt 13 a trough shape in which the central portion in the width direction W protrudes downward. A conveyed object C is loaded, placed on the upper surface of the upper cover rubber 16, and conveyed. On a return side of the conveyor device 10, the upper cover rubber 16 of the conveyor belt 13 is supported by the support rollers 12 in a flat state.

Figure 1:
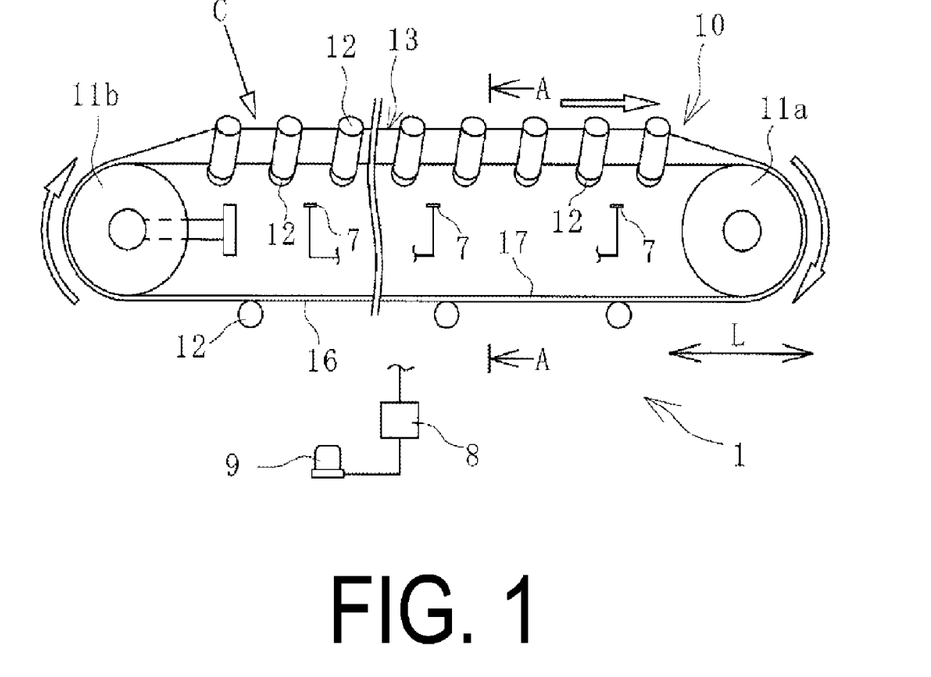
FIG. 1 is an explanatory diagram illustrating a temperature detection device for a conveyor belt according to an embodiment of the present invention installed in a conveyor device from a lateral view of the conveyor belt.

The detection device 1 calculates the temperature of the conveyor belt 13 running. The detection device 1 includes a passive IC tag 2 embedded in the conveyor belt 13, a detector 7, and a calculation unit 8 connected to the detector 7. The detector 7 wirelessly communicates with the IC tag 2. That is, the detector 7 transmits a transmitted radio wave W1 toward the IC tag 2 and receives a returned radio wave W2 returned from the IC tag 2 in response to the transmitted radio wave W1. A computer is used as the calculation unit 8. In the present embodiment, a warning device 9 connected to the calculation unit 8 is further provided. The warning device 9 can optionally be provided.

Figure 3:
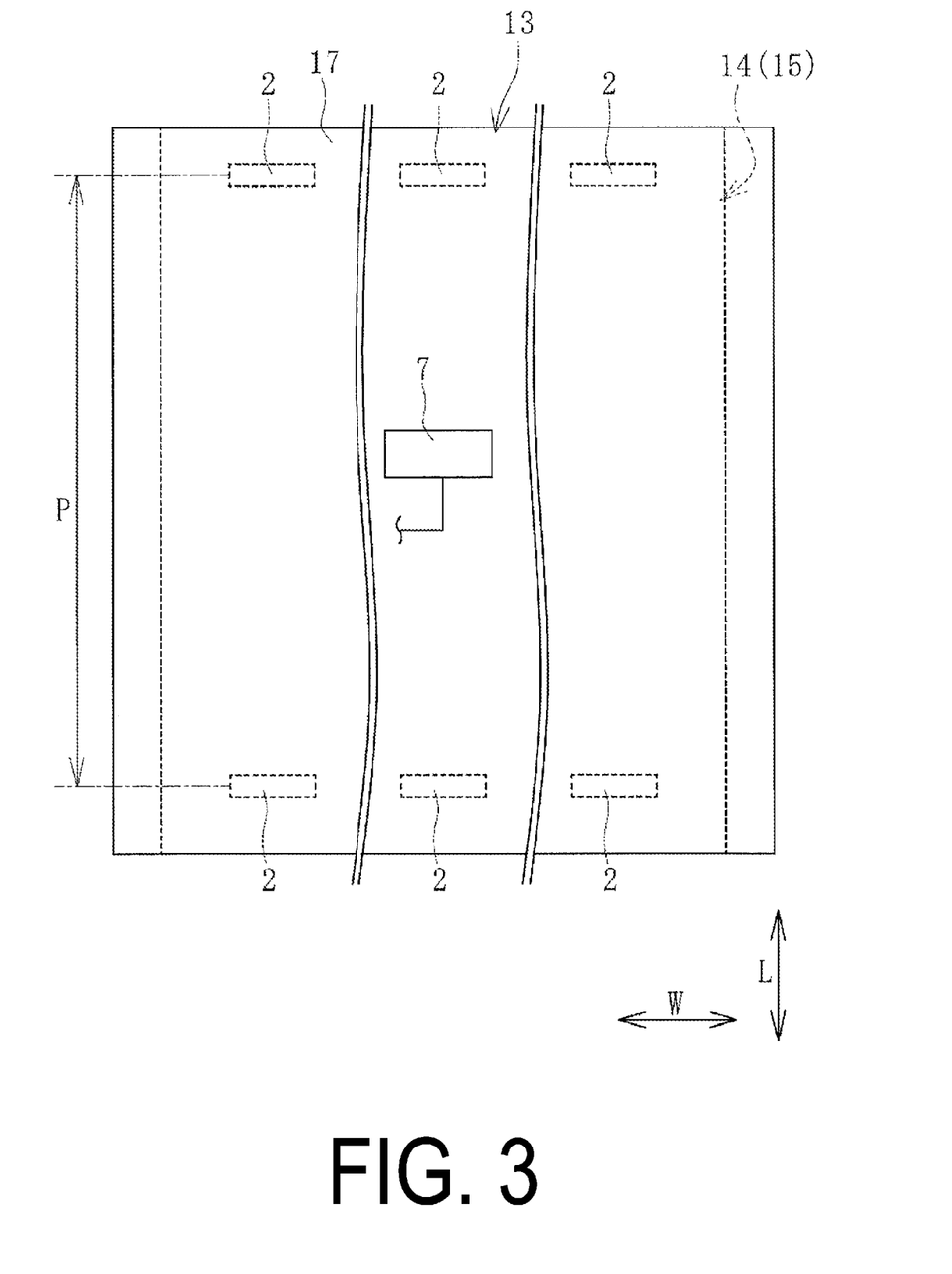
FIG. 3 is an explanatory diagram illustrating the conveyor belt in FIG. 2 as viewed from an arrow B.

In the present embodiment, a plurality of IC tags 2 are embedded at intervals in the longitudinal direction L of the conveyor belt 13 and also embedded at intervals in the width direction W of the conveyor belt 13. In an embodiment of the present invention, the frequency of radio waves used for wireless communication between each IC tag 2 and the detector 7 is mainly in the UHF band (860 MHz or more and 930 MHz or less, depending on the country, 915 MHz or more and 930 MHz in Japan), and the HF band (13.56 MHz) may be used.

Figure 5:
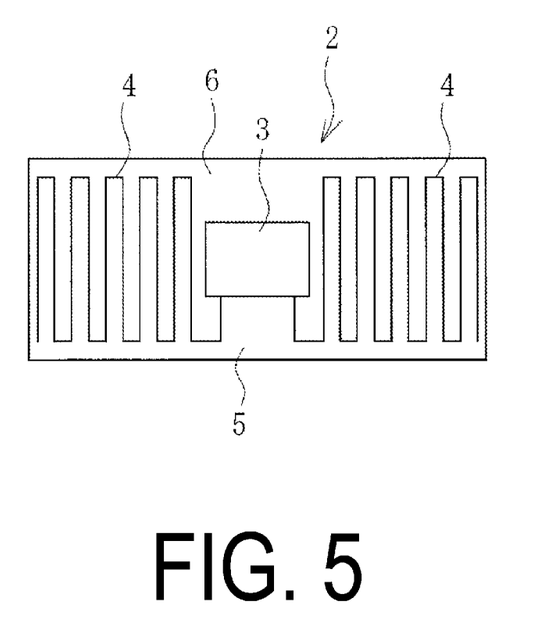
FIG. 5 is an explanatory diagram illustrating an IC tag in a plan view.
Figure 6:
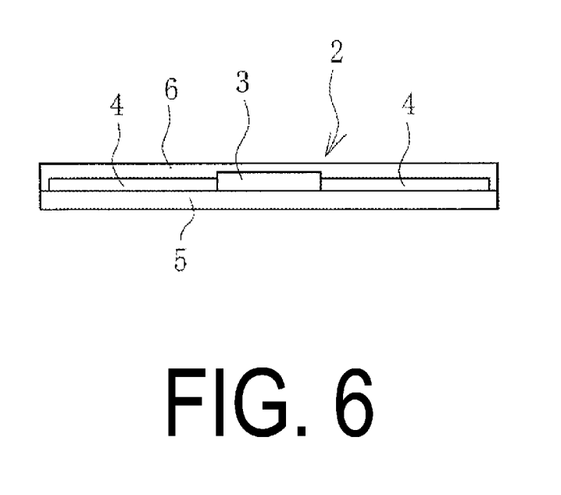
FIG. 6 is an explanatory diagram illustrating the IC tag of FIG. 5 in a cross-sectional view.

As illustrated in FIGS. 5 and 6, the passive IC tag 2 has an IC chip 3 and an antenna unit 4 connected to the IC chip 3. The IC chip 3 and the antenna unit 4 are disposed on a substrate 5 and covered with an insulating layer 6. In the present embodiment, the IC tag 2 is embedded in the core layer 14 as illustrated in FIG. 4. Specifically, the IC tag 2 is embedded between a plurality of canvases 15 layered. The IC tag 2 can be embedded in the lower cover rubber 17 or the upper cover rubber 16. To protect the IC tag 2 from the conveyed object C and the like, the IC tag 2 is preferably embedded in the core layer 14 or the lower cover rubber 17 rather than the upper cover rubber 16.

The IC tag 2 adopts the specifications that are generally available, and for example, an RFID tag can be used. The IC tag 2 has, for example, an area of 200 $mm^2$ or more and 6000 $mm^2$ or less, more preferably 300 $mm^2$ or more and 2700 $mm^2$ or less, and a thickness of 0.01 mm or more and 0.4 mm or less, more preferably 0.03 mm or more and 0.15 mm or less. The heat resistance temperature of the IC tag 2 is, for example, about 250° C.

The IC chip 3 stores arbitrarily necessary data in addition to unique information data such as the identification number of the IC tag 2. In the present embodiment, the IC chip 3 stores the electrical resistance value in the electric circuit of the IC tag 2 when the IC tag 2 is activated by receiving the transmitted radio wave W1.

When manufacturing the conveyor belt 13, the IC tag 2 is disposed in the core layer 14, the unvulcanized upper cover rubber 16, or the unvulcanized lower cover rubber 17 in the molding process to form a molded product. After that, by vulcanizing this molded product, the IC tag 2 is embedded in the conveyor belt 13 in which the core layer 14, the upper cover rubber 16, and the lower cover rubber 17 are integrated. To firmly adhere the IC tag 2 to the core layer 14, the upper cover rubber 16 or the lower cover rubber 17 in which the IC tag 2 is embedded, in the molding process of the conveyor belt 13, the IC tag 2 may be covered with a fiber layer or the like with a dipping liquid immersed and interposed between the objects to be adhered.

The IC tags 2 are embedded in the conveyor belt 13 at intervals of 5 m or more and 20 m or less in the longitudinal direction L, for example. That is, the embedding pitch P of the IC tags 2 illustrated in FIG. 3 is preferably in the range of 5 m or more and 20 m or less, and is preferably equal. Considering the detection accuracy of the temperature of the conveyor belt 13 and the cost, the embedding pitch P of the IC tags 2 is appropriately about 10 m. Note that in the drawings, the embedding pitch P is illustrated shorter than the real embedding pitch P.

The IC tags 2 are preferably embedded in the conveyor belt 13 at intervals in the width direction W so as to correspond to the support rollers 12 arranged in the width direction W. In the present embodiment, the conveyor device 10 has specifications in which three support rollers 12 are arranged in the width direction W, three IC tags 2 are embedded in the conveyor belt 13 at intervals in the width direction W, and one IC tag 2 and one support roller 12 are disposed corresponding one-to-one to each other in the width direction W.

The detector 7 is disposed near the conveyor belt 13 and wirelessly communicates with the IC tag 2 embedded in the conveyor belt 13 without contacting the conveyor belt 13. The detector 7 has a transmitter for the transmitted radio wave W1 and a receiver for the returned radio wave W2. The detector 7 transmits the transmitted radio wave W1 toward the IC tag 2. In addition, the detector 7 receives the returned radio wave W2 returned from the IC tag 2 (antenna unit 4) in response to the transmitted radio wave W1, and acquires various pieces of data stored in the IC chip 3 that are transmitted together with the returned radio wave W2.

As the detector 7, a commonly available specification that enables wireless communication with a passive RFID tag or the like is adopted. In this way, the IC tag 2 and the detector 7 constitute an RFID (Radio Frequency IDentification) system.

In the present embodiment, the detector 7 is disposed on the carrier side of the conveyor device 10, but it can also be disposed on the return side, or on the carrier side and the return side. The distance between the detector 7 and the antenna unit 4 when they are closest to each other is set within 1 m, for example. That is, the detector 7 is preferably installed at a position where the separation distance between the detector 7 and the antenna unit 4 is 1 m or less when the antenna unit 4 passes in front of the detector 7 so that the detector 7 is installed evenly around the entire circumference of the conveyor belt 13.

In the present embodiment, the detectors 7 are disposed at a plurality of detection positions at intervals in the longitudinal direction L of the conveyor belt 13 mounted between the pulleys 11a and 11b. For example, the detectors 7 are disposed at detection positions in the longitudinal direction L at intervals of 10 m or more and 30 m or less. It is preferable that the respective detection positions are substantially equidistant. In the present embodiment, each detector 7 is disposed in the center in the width direction of the conveyor belt 13, but a plurality of detectors 7 may be disposed at the respective detection positions at intervals in the width direction W in accordance with the IC tag 2 embedded in the conveyor belt 13.

The calculation unit 8 is connected to the detector 7 by wires or wirelessly. Data acquired by the detector 7 is input to the calculation unit 8. Then, the calculation unit 8 calculates the temperature of the conveyor belt 13 by performing calculation processing in accordance with the various pieces of input data.

Figure 7:
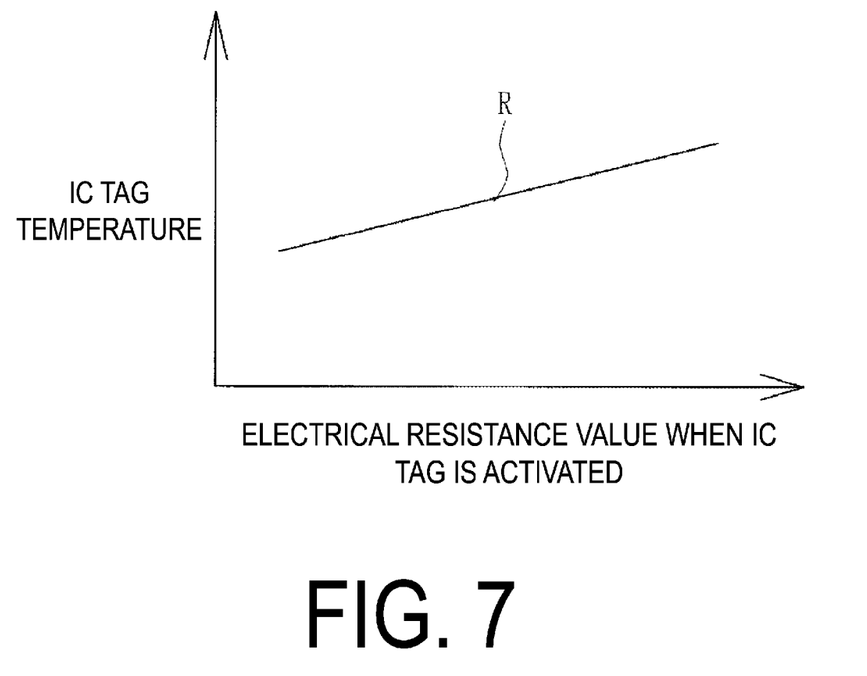
FIG. 7 is a graph showing a correlation between an electrical resistance value of an IC tag when activated and a temperature of the IC tag.

In an embodiment of the present invention, the correlation data R between the electrical resistance value of the IC tag 2 and the temperature of the IC tag 2 when the IC tag 2 illustrated in FIG. 7 is activated is grasped in advance. More specifically, this correlation data R is data indicating the relationship between the electrical resistance value in the electric circuit of the IC tag 2 when the IC tag 2 is activated by receiving the transmitted radio wave W1 and the temperature of the IC tag 2. Generally, since the electrical resistance value in the electrical circuit of the IC tag 2 increases as the temperature of the IC tag 2 increases, the correlation data R rises to the right as illustrated in FIG. 7.

This correlation data R is input to the calculation unit 8. In addition, the calculation unit 8 stores embedded position data (position data in the longitudinal direction L and the width direction W) of each IC tag 2 in the conveyor belt 13 and a reference temperature (threshold) for determining that the conveyor belt 13 is abnormally heated.

The warning device 9 informs the surroundings that the conveyor belt 13 is abnormally heated. Examples of the warning device 9 can include an alarm, a warning lamp, and an alarm indicator. The warning device 9 is connected to the calculation unit 8 by wires or wirelessly, and its operation is controlled by the calculation unit 8. When the calculated temperature of the conveyor belt 13 exceeds the reference temperature, the calculation unit 8 determines that the conveyor belt 13 is abnormally heated and activates the warning device 9.

Next, an example of the procedure of a method for detecting the presence or absence of abnormal heating of the conveyor belt 13 using the detection device 1 will be described.

As shown in FIG. 4, while the conveyor device 10 is in operation (while the conveyor belt 13 is running), each detector 7 transmits a transmitted radio wave W1 toward the IC tag 2. When each IC tag 2 approaches each detector 7, the antenna unit 4 receives the transmitted radio wave W1, and the transmitted radio wave W1 is input to the IC chip 3. Electric power is generated in the IC tag 2 by this transmitted radio wave W1, and the IC tag 2 is activated. The data of the electrical resistance value in the electric circuit of the IC tag 2 when the IC tag 2 is activated is stored in the storage unit of the IC chip 3.

Then, the IC tag 2 sequentially returns a returned radio wave W2 to the detector 7 in response to the transmitted radio wave W1. This returned radio wave W2 is returned from the IC tag 2 to the detector 7 through the antenna unit 4. By receiving this returned radio wave W2, the detector 7 sequentially acquires various pieces of data stored in the IC tag 2 together with the returned radio wave W2. Therefore, the detector 7 acquires the above-described data of the electrical resistance value, embedded position data on the conveyor belt 13, and the like for each IC tag 2.

In the present embodiment, one of the detectors 7 disposed at each detection position at intervals in the longitudinal direction L wirelessly communicates with the IC tags 2 (three IC tags 2) arranged in the width direction L. If one of the detectors 7 disposed at each detection position cannot stably communicate with the IC tags 2 arranged in the width direction L, a required number of detectors 7 are disposed at each detection positions at intervals in the width direction.

The data acquired by the detector 7 is input to the calculation unit 8. The calculation unit 8 calculates the temperature at the position of the conveyor belt 13 where each IC tag 2 is embedded in accordance with the input data of the electrical resistance value of each IC tag 2 and the correlation data R. That is, the calculation unit 8 applies the data of the electrical resistance value input from the detector 7 to the correlation data R illustrated in FIG. 7 to calculate the temperature of the IC tag 2. The calculated temperature of the IC tag 2 can be regarded as the temperature at the position of the conveyor belt 13 where the IC tag 2 is embedded.

As in the present embodiment, when the detectors 7 are disposed at a plurality of detection positions at intervals in the longitudinal direction L of the conveyor belt 13 between the pulleys 11a and 11b, and the plurality of IC tags 2 are embedded at intervals in the longitudinal direction L of the conveyor belt 13, the temperature distribution in the longitudinal direction L of the conveyor belt 13 running can be grasped. Furthermore, when the plurality of IC tags 2 are embedded at intervals in the width direction W of the conveyor belt 13, the temperature distribution in the width direction W of the conveyor belt 13 running can be grasped.

Figure 8:
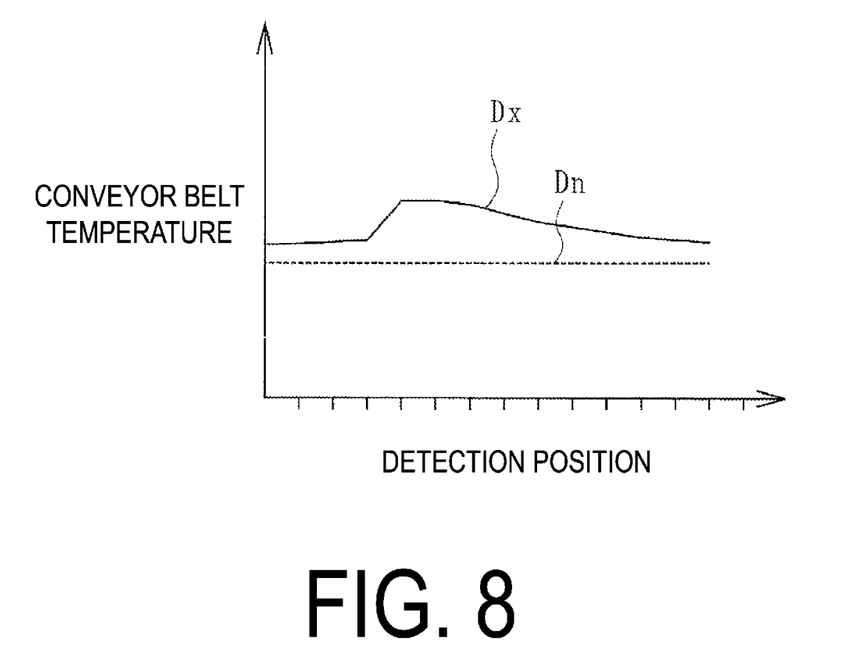
FIG. 8 is an explanatory diagram illustrating a temperature of a conveyor belt at each detection position.

When the support rollers 12 of the conveyor device 10 are rotating normally and the conveyor belt 13 is running steadily, the temperature of the conveyor belt 13 at the detection positions arranged at intervals in the longitudinal direction L is generally constant as indicated by the temperature data Dn indicated by a broken line in FIG. 8. On the other hand, if rotation of any of the support rollers 12 on the carrier side of the conveyor device 10 malfunctions, the frictional resistance between the support roller 12 whose rotation malfunctions and the conveyor belt 13 running increases, abnormally heating the conveyor belt 13. Or when the conveyor belt 13 runs while contacting the frames of the conveyor device 10, the conveyor belt 13 is abnormally heated.

When the conveyor belt 13 is abnormally heated in this manner, the temperature is locally increased as in the temperature data Dx indicated by the solid line in FIG. 8. The temperature of the conveyor belt 13 on the vertical axis in FIG. 8 is the temperature calculated by the calculation unit 8 as described above. As illustrated in FIG. 8, the temperature of the conveyor belt 13 at the detection position near the support roller 12 whose rotation malfunctions or the detection position near the contact position between the frames and the conveyor belt 13 is higher than the temperature of the conveyor belt 13 at the other detection positions.

Therefore, the position in the longitudinal direction L of the conveyor device 10 where the conveyor belt 13 is abnormally heated can be roughly identified in accordance with the temperature data Dx illustrated in FIG. 8. That is, it can be estimated that the rotation of the support roller 12 malfunctions or that the frames and the conveyor belt 13 contact each other near the detection position where the temperature data Dx is at a peak (maximum value).

When the IC tags 2 are embedded in the conveyor belt 13 at intervals in the width direction W, the temperature distribution in the width direction W of the conveyor belt 13 running can be grasped as described above. Therefore, it is advantageous in identifying the position in the width direction W of the conveyor device 10 where the conveyor belt 13 is abnormally heated.

The calculation unit 8 activates the warning device 9 when the calculated temperature of the conveyor belt 13 exceeds the reference temperature. Along with the activation of the warning device 9, water is sprayed on the conveyor belt 13 running to cool the conveyor belt 13. If the calculated temperature of the conveyor belt 13 exceeds the reference temperature and the running of the conveyor belt 13 is immediately stopped, since the air cooling effect on the conveyor belt 13 by running disappears, the temperature of the conveyor belt 13 rises further and it becomes dangerous. Therefore, the running of the conveyor belt 13 is stopped after the conveyor belt 13 is sufficiently cooled.

This detection device 1 has a simple configuration including the passive IC tag 2, the detector 7 that wirelessly communicates with the IC tag 2 without contacting the conveyor belt 13, and the calculation unit 8. A dedicated temperature sensor for detecting the temperature of the conveyor belt 13 is not provided. Therefore, the detection device 1 can be configured with general-purpose components, which is advantageous in terms of cost reduction. Since the temperature of the conveyor belt 13 is detected using the general-purpose IC tag 2, additionally embedding a dedicated temperature sensor in the conveyor belt 13 is unnecessary, advantageously avoiding adverse effects on the durability of the conveyor belt 13.

The data of the electrical resistance value at the time of activation of the IC tag 2 embedded in the conveyor belt 13 running can be obtained by wireless communication between the IC tag 2 and the detector 7, and the data of the electrical resistance value is not substantially affected by the dusty environment where the conveyor line is used. Therefore, the calculation unit 8 can calculate the temperature of the conveyor belt 13 at the position where the IC tag 2 is embedded in accordance with the data of the electrical resistance value and the correlation data R. Therefore, it is advantageous for simply and accurately detecting the presence or absence of abnormal heating of the conveyor belt 13.

When the IC tag 2 is embedded in the core layer 14 as in the present embodiment, the temperature inside the conveyor belt 13 can be grasped. If the IC tag 2 is embedded in the lower cover rubber 17, it becomes easy to detect abnormal heating due to the poor rotation of the support roller 12 on the carrier side.

Further, if the conveyor belt 13 is torn vertically and the embedded IC tag 2 is damaged, the returned radio wave W2 is not returned from the damaged IC tag 2. Therefore, the returned radio wave W2 is not received by the detector 7, and data is not input from the detector 7 to the calculation unit 8.

The calculation unit 8 can determine the presence or absence of damage of each IC tag 2 in accordance with the presence or absence of data input from the detector 7. If it is determined that the IC tag 2 is damaged, the conveyor belt 13 may be torn vertically. Therefore, the conveyor belt 13 is inspected around the embedded position of the IC tag 2 determined to be damaged.

REFERENCE SIGNS LIST

1 Detection device
2 IC tag
3 IC chip
4 Antenna unit
5 Substrate
6 Insulating layer
7 Detector
8 Calculation unit
9 Warning device
10 Conveyor device
11a, 11b Pulley
12 Support roller
13 Conveyor belt
14 Core layer
15 Canvas
16 Upper cover rubber
17 Lower cover rubber
C Conveyed object

The invention claimed is:

1. A temperature detection device for a conveyor belt, the temperature detection device comprising:
a passive IC tag embedded in a conveyor belt;
a plurality of detectors configured to wirelessly communicate with the IC tag without contacting the conveyor belt, the plurality of the detectors being installed evenly around the entire circumference of the conveyor belt between pulleys at intervals in a longitudinal direction of the conveyor belt; and
a calculation unit connected to the detectors; wherein
a returned radio wave returned from the IC tag in response to a transmitted radio wave transmitted from the detectors toward the IC tag being received by the detectors, correlation data between an electrical resistance value in the IC tag and a temperature of the IC tag when the IC tag is activated by receiving the transmitted radio wave being input to the calculation unit, the transmitted radio wave being transmitted from the detectors toward the IC tag embedded in the conveyor belt mounted between the pulleys and running, data of the electrical resistance value being received by the detectors through a returned radio wave returned from the IC tag in response to the transmitted radio wave, a temperature at a position of the conveyor belt where the IC tag is embedded being calculated by the calculation unit in accordance with the data of the electrical resistance value received and the correlation data, and a temperature distribution in the longitudinal direction of the conveyor belt indicating a temperature of the conveyor belt running at detection positions at which each of the detectors is disposed is grasped, and the plurality of the detectors are disposed at intervals of 10 m to 30 m in a longitudinal direction of the conveyor belt between the pulleys.

2. The temperature detection device for a conveyor belt according to claim 1, wherein a plurality of the IC tags is embedded at intervals in a longitudinal direction of the conveyor belt and is embedded at intervals in a width direction of the conveyor belt.

3. The temperature detection device for a conveyor belt according to claim 1, wherein the IC tag is embedded in a lower cover rubber of the conveyor belt.

4. The temperature detection device for a conveyor belt according to claim 1, wherein the IC tag is embedded between a plurality of layers of canvas constituting a core layer of the conveyor belt.

5. A temperature detection method for a conveyor belt for detecting a temperature of the conveyor belt by using a passive IC tag embedded in a conveyor belt, a detector configured to wirelessly communicate with the IC tag without contacting the conveyor belt, and a calculation unit connected to the detector to cause a returned radio wave returned from the IC tag in response to a transmitted radio wave transmitted from the detector toward the IC tag to be received by the detector, the temperature detection method comprising:

grasping in advance correlation data between an electrical resistance value in the IC tag and a temperature of the IC tag when the IC tag is activated by receiving the transmitted radio wave, transmitting a transmitted radio wave from the detector toward the IC tag embedded in the conveyor belt mounted between pulleys and running, receiving, by the detector, data of the electrical resistance value through a returned radio wave returned from the IC tag in response to the transmitted radio wave, calculating, by the calculation unit, a temperature at a position of the conveyor belt where the IC tag is embedded in accordance with the data of the electrical resistance value received and the correlation data, and grasping, by installing a plurality of the detectors evenly around the entire circumference of the conveyor belt between the pulleys at intervals in a longitudinal direction of the conveyor belt, a temperature distribution in the longitudinal direction of the conveyor belt indicating a temperature of the conveyor belt running at detection positions at which each of the detectors is disposed, and wherein the plurality of the detectors are disposed at intervals of 10 m to 30 m in a longitudinal direction of the conveyor belt between the pulleys.

6. The temperature detection device for a conveyor belt according to claim 2, wherein the IC tag is embedded in a lower cover rubber of the conveyor belt.

7. The temperature detection device for a conveyor belt according to claim 2, wherein the IC tag is embedded between a plurality of layers of canvas constituting a core layer of the conveyor belt.

* * * * *